(12) United States Patent
Chen et al.

(10) Patent No.: US 11,408,852 B2
(45) Date of Patent: Aug. 9, 2022

(54) SAMPLING TUBE BUNDLE, SAMPLING ANALYSIS DEVICE AND PREPARATION METHOD OF SAMPLING TUBE BUNDLE

(71) Applicants: TSINGHUA UNIVERSITY, Beijing (CN); Nuctech Company Limited, Beijing (CN); WUHU JIAHONG NEW MATERIAL CO., LTD., Anhui (CN)

(72) Inventors: Zhiqiang Chen, Beijing (CN); Chunan Xu, Wuhu (CN); Qingjun Zhang, Beijing (CN); Fengfeng Xiong, Wuhu (CN); Yuanjing Li, Beijing (CN); Ziran Zhao, Beijing (CN); Yinong Liu, Beijing (CN); Yaohong Liu, Beijing (CN); Ge Li, Beijing (CN); Qiufeng Ma, Beijing (CN); Biao Cao, Beijing (CN)

(73) Assignees: TSINGHUA UNIVERSITY, Beijing (CN); Nuctech Company Limited, Beijing (CN); WUHU JIAHONG NEW MATERIAL CO., LTD., Anhui (CN)

( * ) Notice: Subject to any disclaimer, the term of this patent is extended or adjusted under 35 U.S.C. 154(b) by 264 days.

(21) Appl. No.: 16/621,877

(22) PCT Filed: May 8, 2019

(86) PCT No.: PCT/CN2019/086073
§ 371 (c)(1),
(2) Date: Dec. 12, 2019

(87) PCT Pub. No.: WO2019/218917
PCT Pub. Date: Nov. 21, 2019

(65) Prior Publication Data
US 2020/0110056 A1    Apr. 9, 2020

(30) Foreign Application Priority Data

May 14, 2018 (CN) .......................... 201810458425.5

(51) Int. Cl.
*G01N 1/22* (2006.01)
*G01N 27/622* (2021.01)
(Continued)

(52) U.S. Cl.
CPC ............ *G01N 27/622* (2013.01); *G01N 1/22* (2013.01); *G01N 30/72* (2013.01); *G01N 2030/025* (2013.01)

(58) Field of Classification Search
CPC ........ G01N 27/622; G01N 1/22; G01N 30/72; G01N 2030/025; G01N 1/2202; G01N 2001/2261
(Continued)

(56) References Cited

FOREIGN PATENT DOCUMENTS

| CN | 201222017 Y | 4/2009 |
|---|---|---|
| CN | 202402924 U | 8/2012 |

(Continued)

OTHER PUBLICATIONS

International Search Report dated Jul. 25, 2019 issued in PCT/CN2019/086073.

*Primary Examiner* — Robert R Raevis
(74) *Attorney, Agent, or Firm* — Scully Scott Murphy & Presser (57) ABSTRACT

A sampling tube bundle includes a tube bundle body and a joint assembly. The tube bundle body includes a gas sampling tube for transmitting sampling gas; a metal woven layer wrapping an outer circumference of the gas sampling tube; a heating pad comprising a heat tracing cable wrapping an outer circumference of the metal woven layer, for heating the sampling gas in the gas sampling tube; a flame resistant
(Continued)

tape wound around an outer circumference of the of the heating pad; a plurality of signal transmission lines circumferentially spaced apart from one another are arranged outside the flame resistant tape; and a sheath located outside the signal transmission line. The joint assembly is arranged on an end of the tube bundle body, for connecting to an analysis device or a sampling device.

19 Claims, 2 Drawing Sheets

(51) Int. Cl.
*G01N 30/72* (2006.01)
*G01N 30/02* (2006.01)

(58) Field of Classification Search
USPC ..... 73/863.11, 23.41, 23.42, 864.81, 864.83; 219/607, 636
See application file for complete search history.

(56) References Cited

FOREIGN PATENT DOCUMENTS

| | | | |
|---|---|---|---|
| CN | 104749264 A | | 7/2015 |
| CN | 104764630 | * | 8/2017 |
| CN | 206889947 U | | 1/2018 |
| CN | 108614050 A | | 10/2018 |

* cited by examiner

SAMPLING TUBE BUNDLE, SAMPLING ANALYSIS DEVICE AND PREPARATION METHOD OF SAMPLING TUBE BUNDLE

CROSS-REFERENCE TO RELATED APPLICATIONS

This disclosure is based on International Application No. PCT/CN2019/086073 filed on May 8, 2019, which is based on and claims priority to Chinese application No. 201810458425.5, filed May 14, 2018, the entire contents of which are incorporated herein by reference.

TECHNICAL FIELD

This disclosure relates to a gas-electricity composite sampling analysis device technical field, in particular to a sampling tube bundle, a sampling analysis device and a preparation method of the sampling tube bundle.

BACKGROUND

With increasing various personnel and goods on entry and exit, there is an urgent requirement for the customs workers to gradually improve their working efficiency and quality. At present, a quick inspection on the animal, plants and foods without opening bags in personnel inspection and cargo inspection channels of the customs is generally completed by quarantine dogs. But, the quarantine dogs need long training periods and have high training fees, and the work efficiency of one quarantine dog per day will be greatly reduced as the work time prolongs, so that the quarantine dogs cannot keep high-efficiency working for a long time, and must have a rest for a while after working for a period of times. To this end, an instrument capable of maintaining stable efficiency for a long time is required to assist the quarantine dogs to do the inspection on the animals, plants and foods.

To meet the above-mentioned needs, a sampling analysis instrument based on MCC-IMS technology may be substantially satisfied. Different from laboratory environmental conditions, under the condition of the personnel inspection and the cargo inspection, a special sampling tube bundle which can uniformly heat, transfer heat and transmit electric signals is required to ensure function and performance of the instrument.

For example, there is an analytical corrosion-resistant sampling heat tracing composite tube for an instrument. This tube bundle has three sampling tubes arranged in a 品-shape, a compensation cable and an instrument power supply cable. A self-limiting temperature tracing band is disposed among the three sampling tubes. The three sampling tubes, the compensation cable and the instrument power supply cable are sequentially wrapped with a metal shielding layer, a heat insulation layer, a metal film layer and a sheath layer, wherein the metal shielding layer is an aluminum foil layer, and the sheath layer is a reinforced PE. The tube bundle adopts a structure with a plurality of sampling tubes matched with a heat tracing band, since heat insulation performance, mechanical performance and electromagnetic shielding performance of the tube bundle meet the requirements, the tube bundle can adapt to different process conditions, and can be used for collecting gas samples during environment protection remote monitoring, and the electric heat tracing band ensures that the gas in the sampling tubes is not condensed and is maintained above a Dew point temperature.

However, the analytical corrosion-resistant sampling heat tracing composite tube for the instrument has defects that the heating element adopts a self-limiting temperature heat tracing band, which cannot adjust the temperature in time and cause the temperature control error larger ($>\pm°$ C.), so that it is not suitable for the use conditions of an MCC-IMS instrument in personnel inspection and cargo inspection. Specifically, the self-limiting temperature heat tracing band of the pipe bundle, after being used for a period of time, suffers power attenuation, and thus prolonging the preparation time of the instrument. And fixing way of the heating element cannot ensure that the sampling tube is uniformly heated, so that high-boiling substances are easily remained in uneven places. Moreover, the heat insulation material and the sheath material have hardness higher, and thereby adapt to greater deformation, so that it is not beneficial for flexible sampling. In addition, such tube bundle has no interface and cannot be connected or replaced quickly and conveniently.

Furthermore, some of the existing quick-connection flexible composite sampling tubes provide support for the inner tube via a fiber braid bonded to the inner tube so as to be protected from being tangled. The tube bundle is provided with an internal heat insulation wrapping layer, so that external heat insulation is not required in many applications. A stainless steel braid layer is provided to ensure pressure bearing capacity of a hose and protect the inner tube from abrasion. An outer silicone layer provides a smooth, contamination-free, easily cleaned surface and provides heat insulation for internal system fluids at extreme temperatures, and usually used in a site where flexibility, chemical compatibility and external heat insulation (hot/cold) layers are required. The tube bundle can be used together with a single signal transmission shielded cable to complete gas sampling and transmission of the electric signals.

However, for the above-described conventional quick-connection flexible composite sampling tubes, following drawbacks are presented. The tube bundle is merely equipped with a heat insulation layer, but not provided with the heating element, which causes the high-boiling substance is very easily remained. Moreover, the tube bundle is not provided with the electric signal transmission cable therein, so that a cable needs to be additionally arranged and has a lower integration level, which does not facilitate for the actual operation.

SUMMARY

According to one aspect of the present disclosure, a sampling tube bundle is provided. The sampling tube bundle includes a tube bundle body and a joint assembly. The tube bundle body includes a gas sampling tube for transmitting sampling gas; a metal woven layer wrapping an outer circumference of the gas sampling tube; a heating pad comprising a heat tracing cable wrapping an outer circumference of the metal woven layer, for heating the sampling gas in the gas sampling tube; a flame resistant tape wound around an outer circumference of the of the heating pad; a plurality of signal transmission lines circumferentially spaced apart from one another are arranged outside the flame resistant tape; and a sheath located outside the signal transmission line. The joint assembly is arranged on an end of the tube bundle body, for connecting to an analysis device or a sampling device.

According to one of the implementations of the present disclosure, the gas sampling tube is made of polytetrafluoroethylene.

According to one of the implementations of the present disclosure, the metal braided layer is woven by a tinned copper wire.

According to one of the implementations of the present disclosure, the heat tracing cable is a self-controlling temperature heat tracing cable; the heating pad is provided with a temperature sensor; and the heating pad controls heating temperature of the heat tracing cable by using a PID control method according to a measurement result of the temperature sensor.

According to one of the implementations of the present disclosure, the temperature sensor is located at a position corresponding to an intermediate position in an axial direction of the gas sampling tube.

According to one of the implementations of the present disclosure, the temperature sensor is provided with a platinum resistor; and a specification of the platinum resistor is Pt1000.

According to one of the implementations of the present disclosure, the heating pad also includes a distance insulation tape; and the distance insulation tape and the heat tracing cable are uniformly wound on the outer circumference of the metal woven layer in a double-spiral mode.

According to one of the implementations of the present disclosure, the distance insulation belt is made of fluoroplastic.

According to one of the implementations of the present disclosure, the flame resistant tape is made of low-smoke halogen-free cable materials.

According to one of the implementations of the present disclosure, a conductor type of the signal transmission line is an anti-attenuation conductor.

According to one of the implementations of the present disclosure, the sampling tube bundle further includes a signal wire heat insulation layer; the signal wire heat insulation layer wraps the outer circumference of the flame resistant tape; wherein the plurality of signal transmission lines are disposed in the signal wire insulation layer.

According to one of the implementations of the present disclosure, the signal wire insulation layer is made of fluoroplastics.

According to one of the implementations of the present disclosure, the sheath includes a fireproof layer, a heat insulation layer and a woven mesh, sequentially arranged outside the signal transmission line from inside to outside (or coated around the outer circumference of the signal line insulation layer).

According to one of the implementations of the present disclosure, the fireproof layer is made of glass fibers.

According to one of the implementations of the present disclosure, material of heat insulation layer is environmental-friendly silica gel.

According to one of the implementations of the present disclosure, the woven mesh is made of a flame resistant material.

According to one of the implementations of the present disclosure, the joint assembly includes: a tube bundle joint connected to the end of the tube bundle body; a gas path joint arranged on the tube bundle joint and communicated with the gas sampling tube, for connecting with a gas path interface of the analysis device or the sampling device; and a circuit joint arranged on the tube bundle joint and electrically connected to the signal transmission line, for connecting with a circuit interface of the analysis device or the sampling device.

According to one of the implementations of the present disclosure, the tube bundle joint is a non-standard threaded quick joint.

According to one of the implementations of the present disclosure, the tube bundle joint is made of polyether ether ketone.

According to one of the implementations of the present disclosure, the gas path joint is a clip-type quick joint.

According to one of the implementations of the present disclosure, the gas path joint is made of stainless steel.

According to another aspect of the present disclosure, a sampling analysis device is provided. The sampling analysis device includes a gas chromatograph and a gas collection sampler; wherein the gas collection sampler is connected with the gas chromatograph through a sampling tube bundle according to the above implementations.

According to another aspect of the present disclosure, a sampling analysis device is provided. The sampling analysis device includes an ion mobility spectrometer and a gas collection sampler; wherein the gas collection sampler is connected with the ion mobility spectrometer through the sampling tube bundle according to the above implementations.

According to another aspect of the present disclosure, a sampling analysis device is provided. The sampling analysis device includes a gas chromatograph, an ion mobility spectrometer and a gas collection sampler; wherein the gas collection sampler is connected with the gas chromatograph through a sampling tube bundle according to the above implementations.

According to one of the implementations of the present disclosure, the gas collection sampler is connected with the ion mobility spectrometer through the sampling tube bundle according to present disclosure.

According to one of the implementations of the present disclosure, the gas chromatograph is connected with the ion mobility spectrometer through the sampling tube bundle according to present disclosure.

According to another aspect of the present disclosure, a sampling analysis device is provided. The sampling analysis device includes a gas chromatograph, an ion mobility spectrometer and a gas collection sampler; wherein the gas collection sampler is connected with the ion mobility spectrometer through the sampling tube bundle according to the above implementations.

According to one of the implementations of the present disclosure, the gas collection sampler is connected with the gas chromatograph through the sampling tube bundle according to the above implementations.

According to one of the implementations of the present disclosure, the gas chromatograph is connected with the ion mobility spectrometer through the sampling tube bundle according to the above implementations.

According to a further aspect of the present disclosure, a preparation method of a sampling tube bundle is provided. The preparation method of the sampling tube bundle includes steps of providing a gas sampling tube; weaving and wrapping a metal woven layer around the outer circumference of the gas sampling tube; sticking a temperature sensor to the metal woven layer; winding a heat tracing cable around the outer circumference of the metal woven layer; winding a flame resistant tape around the outer circumference of the heat tracing cable; winding and fixing a plurality of signal transmission lines around the outer circumference of the flame resistant tape by using a fireproof layer, and an end of the tube bundle being connected with a joint assembly; coating a heat insulation layer around the outer circumference of th fireproof layer; and weaving and wrapping a woven mesh around the outer circumference of the heat insulation layer.

The reference numerals are list as follows:

100 tube bundle body; 110 gas sampling tube; 120 metal woven layer; 130 heating pad; 131 temperature sensor; 132 heat tracing cable; 133 distance insulation tape; 140 flame resistant tape; 150 signal transmission line; 160 fire barrier; 170 heat insulation layer; 180 woven mesh; 190 signal wire insulation layer; 200 joint assembly; 210 tube bundle joint; 220 gas path joint; 230 circuit joint.

DETAILED DESCRIPTION

The same reference numbers denote the same or similar structures in the drawings, and thus detailed descriptions thereof will be omitted. Now, the exemplary implementations will be described more completely with reference to the accompanying drawings. However, the exemplary implementations can be done in various forms and should not be construed as limiting the implementations as set forth herein. Instead, these implementations are provided so that this disclosure will be thorough and complete, and concept of the exemplary implementation will be fully conveyed to those skilled in the art.

A primary object of the present disclosure is to provide a sampling tube bundle having both a heating temperature regulating function and an electrical signal transmission function so as to overcome at least one of the above-described disadvantages in the prior art.

Another primary object of the present disclosure is to provide a sampling analysis device having safe and reliable sample transmission and a higher sampling performance so as to overcome at least one of the above-described disadvantages in the prior art.

A further primary object of the present disclosure is to provide a preparation method of a sampling tube bundle so as to overcome at least one of the above-described disadvantages in the prior art.

To achieve the above objects, the following technical solutions are adopted in the present disclosure.

Implementation of the Sampling Tube Bundle

Figure 1:
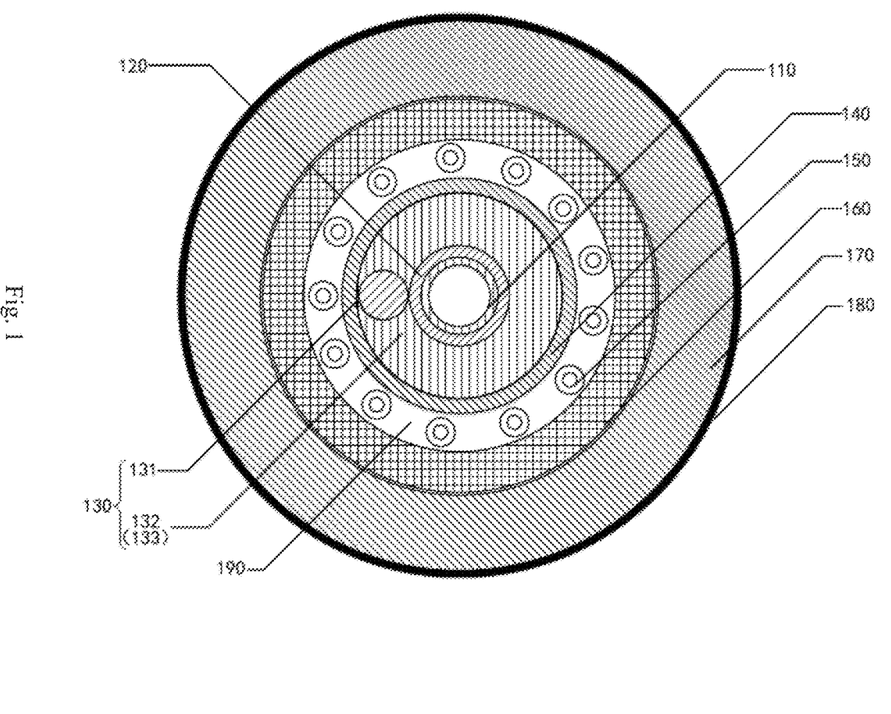
FIG. 1 is a tube bundle cross-sectional view of a sampling tube bundle shown according to an exemplary implementation.

Referring to FIG. 1, a tube bundle cross-sectional view of a sampling tube bundle capable of embodying the principles of the present disclosure is representatively illustrated. In this exemplary embodiment, the sampling tube bundle proposed by the present disclosure is described as an example of a tube bundle applied to an MCC-IMS system (i.e., a fast gas chromatography-ion mobility spectrometry spectrometer), and further, as an example of a tube bundle connected between the gas chromatograph and an ion mobility spectrometer of the MCC-IMS system. It is readily appreciated for those skilled in the art that many modifications, additions, substitutions, deletions, or other changes may be made to the specific embodiments described below in order to apply such design of the sampling tube bundle of the present disclosure to other types of devices, and such changes are still within the scope of the principles of the sampling tube bundle as set forth herein.

Figure 2:
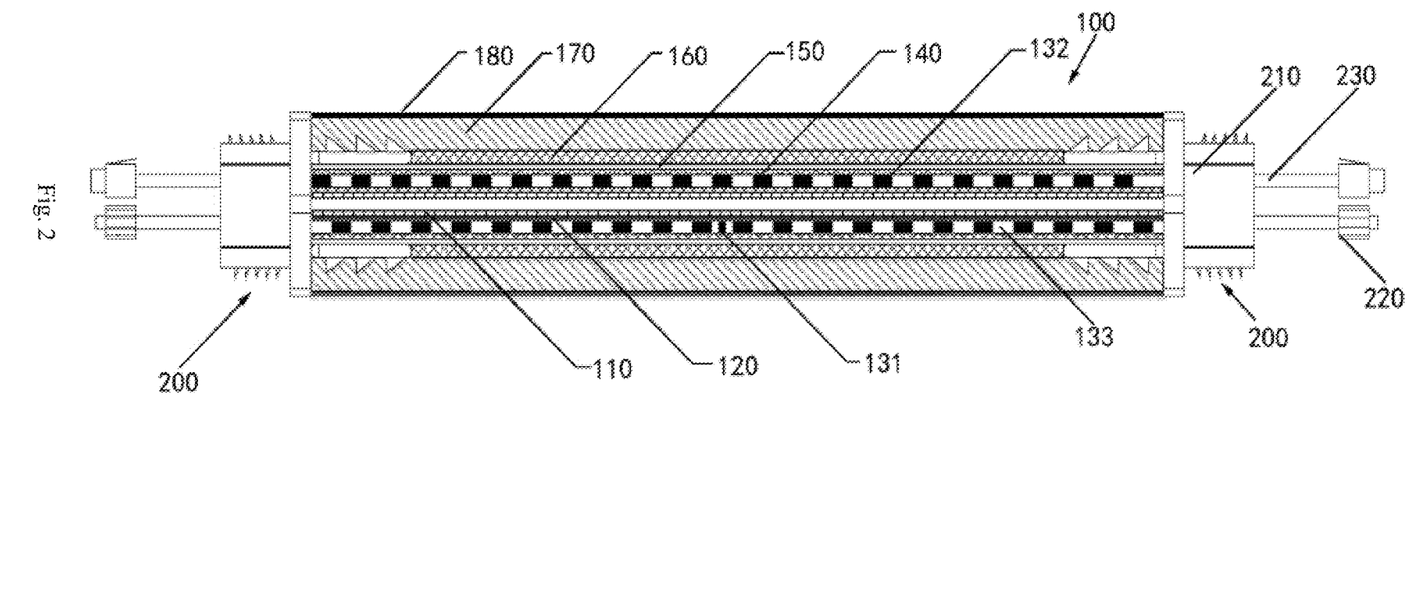
FIG. 2 is a cross-sectional view of the sampling tube bundle as shown in FIG. 1.

As shown in FIG. 1, in this implementation, the sampling tube bundle proposed by the present disclosure mainly includes a tube bundle body and two sets of joint assemblies. Referring to FIG. 2 in conjunction, a cross-sectional view of a sampling tube bundle capable of embodying principles of the present disclosure is representatively illustrated. In addition, directions relating to "axial" and "radial" hereinafter specifically refer to an axial direction and a radial direction of the sampling tube bundle. The structure, connection mode and functional relationship of the main components of the sampling tube bundle proposed by the present disclosure will be described in detail below with reference to the above-mentioned figures.

As shown in FIGS. 1 and 2, in this implementation, the bundle body 100 mainly includes a gas sampling tube 110, a metal woven layer 120, a heating pad 130, a flame resistant tape 140, a plurality of signal transmission lines 150, a signal wire insulation layer 190, and a sheath.

Specifically, as shown in FIGS. 1 and 2, in this implementation, the gas sampling tube 110 is presented in a tubular structure and is used for delivery of the sampling gas. Preferably, the gas sampling tube 110 is preferably made of Polytetrafluoroethylene (PTFE), which has characteristics of high temperature resistance, corrosion resistance and lower outgassing rate at a high temperature environment, is suitable for the transmission of the sampling gas with high-temperature and corrosion, and does not easily affect the inspection on the sampling gas. In other implementations, the gas sampling tube 110 may also be made of other materials with at least one of the above characteristics, which is not limited to this implementation.

As shown in FIGS. 1 and 2, in this implementation, the gas sampling tube 110 is coated with a metal woven layer 120, which may be woven by metal wires, for protecting and supporting the gas sampling tube 110, and also serves as a circuit. Preferably, the metal woven layer is preferably woven with a tinned copper wire having a characteristic of oxidation resistant to the surface. In other implementations, the metal woven layer 120 may be woven with metal wires of other materials, which is not limited to this implementation.

As shown in FIGS. 1 and 2, in this implementation, the heating pad 130 is wrapped outside the metal woven layer 120, for heating and insulating the sample gas in the gas sampling tube 110. The heating pad 130 is provided with a temperature sensor 131 which, for example, may be adhered to the metal woven layer 120, so that the heating pad 130 can control the heating temperature of the heating pad 130 (for example, by a controller) according to measurement results of the temperature sensor 131. Accordingly, the heat insulation mode of the heating pad 130 to the gas sampling tube 110 is embodied as a temperature control mode in a PID (proportion, integral, derivative) mode, that is, a set of closed-loop automatic control system is formed, having a control principle of reducing uncertainty based on the concept of feedback, and the feedback control element mainly includes measurement, comparison and execution. According to this, such design of the sensor feedback type heat tracing band with adjustable temperature can be realized, the real-time adjustment of the temperature can be realized, heating is more uniform, and the temperature control error is smaller. Through the above design, the present disclosure can adjust different sampling temperatures by using the heating pad 130, so as to remove residues of the substances with different boiling points.

Further, as shown in FIG. 2, in this implementation, the temperature sensor 131 is preferably located at a position corresponding to an intermediate position on the axial position of the gas sampling tube 110, so that the measurement result of the temperature sensor 131 can be optimized. Furthermore, the temperature sensor 131 may also be in plural and are axially distributed at a plurality of different positions outside the gas sampling tube 110, so that the closed-loop automatic control system controls the temperature according to the average value of the plurality of measurement results, thereby further optimizing the temperature control effect.

Further, in this implementation, the temperature sensor 131 has a platinum resistor, which is preferably pt 1000, so that a technical effect of high accuracy and small thermal inertia can be achieved.

As shown in FIGS. 1 and 2, in this implementation, the heating pad 130 is mainly formed by winding the heat tracing cable 132 and the distance insulation tape 133, and the temperature sensor 131 is located in the winding gap of the distance insulation tape 133. In the embodiment where the distance insulation tape is not provided, the temperature sensor 131 may also be located in the winding gap of the heat tracing cable 132. Specifically, the heat tracing cable 132 and the distance insulation tape 133 are uniformly wound around an outer circumference of the metal woven layer 120 in a double spiral manner. The distance insulation tape 133 can structurally isolate the heat tracing cable 132, and the double-spiral winding mode enables the heat tracing cable 132 to be evenly wound outside the gas sampling tube 110, so that respective position of the gas sampling tube 110 is heated more evenly. In other implementations, the heating pad 130 may be formed by winding the heat tracing cable 132 around the outer circumference of the metal woven layer 120 or by matching with other structures, which is not limited to this implementation.

Further, in this implementation, the distance insulation tape 133 is preferably made of fluoroplastic, which has characteristics of high temperature resistance and corrosion resistance. In other implementations, the distance insulation tape 133 may also be made of other materials having at least one of the above characteristics, and is not limited to this implementation.

As shown in FIGS. 1 and 2, in this implementation, the flame resistant tape 140 is tightly wound around the outer circumference of the heating pad 130, for providing the heating pad 130 with a flame resistant and insulating effect. Preferably, the flame resistant tape 140 is preferably made of a low-smoke halogen-free cable material, which has characteristics of environmental protection, no halogen and better insulating property. In other implementations, the flame resistant tape 140 may be made of other materials having at least one of the above characteristics, which is not limited to this implementation.

As shown in FIGS. 1 and 2, in this implementation, signal transmission lines 150 extend in parallel to the axial direction, and a plurality of the signal transmission lines 150 are arranged at intervals in the circumferential direction outside the flame resistant tape 140. Thus, due to arrangement of the signal transmission lines 150 of the present disclosure, the function of transmitting the electric signals by the sampling tube bundle is given such that the transmission of gas, the heat insulation and the transmission of the electric signals are integrated on the same sampling tube bundle, so that the gas-electric composite function of the sampling tube bundle can be realized. The signal transmission line may transmit electrical signals between an analysis device (e.g., an ion mobility spectrometer) and a sampling device, and for example, may include signal wires connected to indicator lights on the sampling device and electrical wires for controlling to heat the components of the sampling device.

Further, in this implementation, a conductor of the signal transmission line 150 is preferably an anti-attenuation conductor, which has a characteristic of high signal transmission efficiency. In other implementations, the signal transmission line 150 may also select other conductor types, which is not limited to this implementation.

As shown in FIGS. 1 and 2, in this implementation, the signal wire insulation layer 190 wraps the outer circumference of the flame resistant tape 140, and a plurality of signal transmission lines 150 are substantially disposed within the signal wire insulation layer 190, to provide the signal transmission lines 150 with insulation protection through the signal wire insulation layer 190. In other implementations, the other methods may be used to provide insulation protection for the signal transmission line 150, which is not limited to this implementation.

Further, in this implementation, the signal wire insulation layer 190 is preferably made of fluoroplastic, which has characteristics of high temperature resistance and corrosion resistance. In other implementations, the signal wire insulation layer 190 may also be made of other materials with at least one of the above characteristics, which is not limited to this implementation.

As shown in FIGS. 1 and 2, in this implementation, the sheath mainly includes a fireproof layer 160, an heat insulation layer 170, and a woven mesh 180, which are sequentially coated on the outer circumference of the signal transmission line 150 (or the signal insulation layer 190) from inside to outside, that is, the fireproof layer 160 wraps the outer circumference of the signal transmission line 150 (or the signal wire insulation layer 190); the heat insulation layer 170 wraps the outer circumference of the fireproof layer 160, and the woven mesh 180 wraps the outer circumference of the heat insulation layer 170. The fireproof layer 160 can provide functions of fire prevention and heat insulation, and the signal wire insulation layer 190 provided with the signal transmission line 150 can be wound and fixed on the periphery of the flame resistant tape 140 by using the fireproof layer 160 during the process. The heat insulation layer 170 can provide the function of heat insulation, and the woven mesh 180 can provide the function of securing and protecting the sampling tube bundle.

Further, in this implementation, the fireproof layer 160 is preferably made of a glass fiber, which has characteristics of non-flammability, high temperature resistance, and heat insulation. In other implementations, the fireproof layer 160 may also be made of other materials with at least one of the above characteristics, which is not limited to this implementation.

Further, in this implementation, material of the heat insulation layer 170 is preferably environmental-friendly silica gel, such as medium-density food-grade silica gel, having no odor, no interference source generation, and low heat conductivity. In other implementations, the heat insulation layer 170 may be made of other materials with at least one of the above characteristics, which is not limited to this implementation.

Further, in this implementation, the woven mesh 180 is made of a flame resistant material to further provide flame resistance protection for the sampling tube bundle.

As shown in FIG. 2, in this implementation, two sets of joint assemblies 200 are respectively disposed on both ends of the tube bundle body 100, for connecting to the analysis device or the sampling device.

Specifically, as shown in FIG. 2, in this implementation, each set of joint assemblies 200 mainly includes a tube bundle joint 210, a gas path joint 220, and a circuit joint 230. The bundle joint 210 is connected to the end of the tube bundle body 100, and a portion of the joint structure is fixed between the fireproof layer 160 and the heat insulation layer 170 at the end of the tube bundle body 100. The gas path joint 220 is disposed on the tube bundle joint 210 and is communicated with the gas sampling tube 110 of the tube bundle body 100, so as to be connected with the gas path interface of the analysis device or the sampling device. The circuit joint 230 is disposed on the tube bundle joint 210 and electrically connected to the signal transmission line 150 of the tube bundle body 100, for connecting to the circuit interface of the analysis device or the sampling device.

Further, in this implementation, the tube bundle joint 210 is preferably a non-standard threaded quick-connect joint.

Further, in this implementation, the tube bundle joint 210 is preferably made of polyetheretherketone (PEEK), which has a characteristic of high temperature resistance. In other implementations, the tube bundle joint 210 may be made of other materials, which is not limited to this implementation.

Further, in this implementation, the gas path joint 220 is preferably a ferrule quick joint, which has a characteristic of good sealing property and tight connection. In other implementations, the gas path joint 220 may also be in other joint forms with at least one of the above characteristics, which is not limited to this implementation.

Further, in this implementation, the gas path joint 220 is preferably made of stainless steel, which has characteristics of high temperature resistance and corrosion resistance. In other implementations, the gas path joint 220 may be made of other materials with at least one of the above characteristics, which is not limited to this implementation.

Further, in this implementation, the circuit joint 230 may preferably have a joint form, which has characteristics of small insertion loss and small contact resistance.

As described above, in this implementation, the sampling tube bundle has an outer diameter of not greater than 3 cm, and a length between 0.8 m and 2 m. The sampling tube bundle had a maximum holding temperature of 120° C., a maximum exposure temperature of 200° C., and a minimum ambient temperature of −20° C. When the sampling tube bundle is operated at the maximum holding temperature, the temperature of the sheath of the sampling tube bundle (i.e., the temperature of the woven mesh 180) is not greater than 40° C. The sampling tube bundle has a supply voltage of about 12V and a power of about 40 W. The sampling tube bundle can resist corrosion of various acid and alkali medium, with a compressive strength of about 1.0 Mpa, so that no leakage occurs. The material coated each layer of the sampling tube bundle is flexible material and has characteristics of easily bending, winding and small curvature radius. The gas sampling tube 110 of the sampling tube bundle may have an inner diameter of about 2.2 mm and an outer diameter of about 4 mm. The time as required for heating the sampling tube bundle to the maximum holding temperature (e.g., 120 c) is no more than 15 minutes.

It should be noted that introduction of the various parameters of the sampling tube bundle proposed by the present disclosure is only an exemplary illustration based on an existing MCC-IMS system. In order to adapt to different inspection requirements or to apply the sampling tube bundle to the sampling analysis devices of other types, those parameters of the sampling tube bundle can be respectively adjusted without interference, which is not limited to this implementation.

As above described, the sampling tube bundle provided by the present disclosure realizes such design of the sensor feedback type heat tracing band with adjustable temperature by arranging the temperature sensor in the heating pad, realizes the real-time adjustment of the temperature, more uniform heating and smaller temperature control error, and thus is more suitable for the use conditions of an MCC-IMS instrument in personnel inspection and cargo inspection as compared with the conventional tube bundle. Meanwhile, the present disclosure provides a transmission function of the electric signals by utilizing the design of the signal transmission line and the related structure thereof, so as to realize the gas-electric composite function of the tube bundle.

Implementation of the Sample Analysis Device

In this implementation, the sampling analysis device provided by the present disclosure is described as an example of an MCC-IMS system (i.e., a rapid gas chromatography-ion mobility spectrometry combined spectrometer), and further as an example of a sampling analysis system having a gas chromatograph and an ion mobility spectrometer. It is readily appreciated for those skilled in the art that many modifications, additions, substitutions, deletions, or other changes may be made to the specific embodiments described below in order to apply such design of the sampling tube bundle of the present disclosure to other similar systems, and such changes are still within the scope of the principles of the sampling tube bundle as set forth herein.

In this implementation, the sampling and analyzing device provided by the present disclosure mainly includes a gas collection sampler, a gas chromatograph, and an ion mobility spectrometer. The gas collection sampler is connected with the gas chromatograph through the sampling tube bundle provided by this disclosure, and the gas chromatograph is connected with the ion mobility spectrometer through the sampling tube bundle provided by this disclosure. In other implementations, the sampling tube bundle provided by the present disclosure may merely be connected between the gas collection sampler and the gas chromatograph or between the gas chromatograph and the ion mobility spectrometer, which is not limited to this implementation.

As above described, the sampling analysis device provided by this disclosure has an advantage as follows: the sampling tube bundle provided by this disclosure is connected with the sampling device or the analysis device, so that the sampling transmission is safer and more reliable, and the sampling performance is higher.

Implementation of the Preparation Method of the Sampling Tube Bundle

Based on the above exemplary description of the sampling tube bundle proposed by the present disclosure, one exemplary implementation of the preparation method of the sampling tube bundle as the above representative implementation is described in detail below.

In this implementation, the preparation method of a sampling tube bundle according to the present disclosure mainly includes following steps of:

providing a gas sampling tube;

weaving and wrapping a metal woven layer on an outer circumference of the gas sampling tube;

sticking a temperature sensor on the metal woven layer;

winding a heat tracing cable around the outer circumference of the metal woven layer;

winding a flame resistant tape around the outer circumference of the heat tracing cable;

winding and fixing a plurality of signal transmission lines on the outer circumference of the flame resistant tape by using a fireproof layer, and connecting to the joint assembly on an end of the tube bundle;

coating a heat insulation layer around the outer circumference of the fireproof layer; and weaving and wrapping a woven mesh around the outer circumference of the heat insulation layer.

In this implementation, for the related steps of winding the heat tracing cable, the heat tracing cable and the distance insulation tape are further wound around the outer circumference of the metal woven layer in a manner similar to the double-spiral manner, so that the heating pad with the heat tracing cable is formed.

Although the present disclosure has been described with reference to a few of exemplary embodiments, it should be understood that all the terms used are illustrative and exemplary, and nonrestrictive. As the present disclosure may be embodied in a variety of forms without departing from the spirit or scope of the invention, it is to be understood that the above-described embodiments are not limited to any foregoing detail. All changes and modifications within the scope of the claims or their equivalents are intended to be embraced by the appended claims.

What is claimed is:

1. A sampling tube bundle, comprising:
    a tube bundle body comprising:
        a gas sampling tube for transmitting a sampling gas;
        a metal woven layer wrapping an outer circumference of the gas sampling tube;
        a heating pad comprising a heat tracing cable wrapping an outer circumference of the metal woven layer, for heating the sampling gas in the gas sampling tube;
        a flame resistant tape wound around an outer circumference of the of the heating pad;
        a plurality of signal transmission lines circumferentially spaced apart from one another are arranged outside the flame resistant tape; and
        a sheath located outside the signal transmission line; and
    a joint assembly arranged on an end of the tube bundle body, for connecting to an analysis device or a sampling device.

2. The sampling tube bundle according to claim 1, wherein the gas sampling tube is made of polytetrafluoroethylene and wherein the metal woven layer is woven by a tinned copper wire.

3. The sampling tube bundle according to claim 1, wherein the heat tracing cable is a self-controlling temperature heat tracing cable;
    the heating pad is provided with a temperature sensor; and
    the heating pad controls a heating temperature of the heat tracing cable by using a PID control method according to a measurement result of the temperature sensor.

4. The sampling tube bundle according to claim 3, wherein the temperature sensor is located at a position corresponding to an intermediate position in an axial direction of the gas sampling tube.

5. The sampling tube bundle according to claim 3, wherein the temperature sensor is provided with a platinum resistor; and a specification of the platinum resistor is Pt1000.

6. The sampling tube bundle according to claim 1, wherein the heating pad further comprises a distance insulation tape; and the distance insulation tape together with the heat tracing cable are uniformly wound on an outer circumference of the metal woven layer in a double-spiral mode.

7. The sampling tube bundle according to claim 6, wherein the distance insulation tape is made of fluoroplastic, the flame resistant tape is made of low-smoke halogen-free cable materials, and a conductor type of the signal transmission line is an anti-attenuation conductor.

8. The sampling tube bundle according to claim 1, wherein the sampling tube bundle further comprises a signal wire heat insulation layer;
    the signal wire heat insulation layer wraps the outer circumference of the flame resistant tape;
    wherein the plurality of signal transmission lines are disposed in the signal wire insulation layer.

9. The sampling tube bundle according to claim 8, wherein the signal wire insulation layer is made of fluoroplastics.

10. The sampling tube bundle according to claim 1, wherein the sheath comprises a fireproof layer, a heat insulation layer and a woven mesh, sequentially arranged outside the signal transmission line from inside to outside.

11. The sampling tube bundle according to claim 10, wherein the fireproof layer is made of glass fibers, a material of heat insulation layer is environmental-friendly silica gel, and the woven mesh is made of a flame resistant material.

12. The sampling tube bundle according to claim 1, wherein the joint assembly comprises:
    a tube bundle joint connected to an end of the tube bundle body;
    a gas path joint arranged on the tube bundle joint and communicated with the gas sampling tube, for connecting with a gas path interface of the analysis device or the sampling device; and
    a circuit joint arranged on the tube bundle joint and electrically connected to the signal transmission line, for connecting with a circuit interface of the analysis device or the sampling device.

13. A sampling analysis device comprising:
    a gas chromatograph or an ion mobility spectrometer; and
    a gas collection sampler connected with the gas chromatograph or the ion mobility spectrometer through a sampling tube bundle according to claim 1.

14. A sampling analysis system comprising:
    a gas chromatograph, an ion mobility spectrometer and a gas collection sampler;
    wherein the gas collection sampler is connected with the gas chromatograph through a sampling tube bundle according to claim 1.

15. The sample analysis system according to claim 14, wherein:
    the gas collection sampler is connected with the ion mobility spectrometer through a second sampling tube bundle,
    the second sampling tube bundle comprises a tube bundle body comprising a gas sampling tube for transmitting a sampling gas, a metal woven layer wrapping an outer circumference of the gas sampling tube, a heating pad comprising a heat tracing cable wrapping an outer circumference of the metal woven layer, for heating the sampling gas in the gas sampling tube, a flame resistant tape wound around an outer circumference of the of the heating pad, a plurality of signal transmission lines circumferentially spaced apart from one another are arranged outside the flame resistant tape, and a sheath located outside the signal transmission line; and a joint assembly arranged on an end of the tube bundle body, for connecting to an analysis device or a sampling device;

the gas chromatograph is connected with the ion mobility spectrometer through a third sampling tube bundle, the third sampling tube bundle comprises a tube bundle body comprising a gas sampling tube for transmitting a sampling gas, a metal woven layer wrapping an outer circumference of the gas sampling tube, a heating pad comprising a heat tracing cable wrapping an outer circumference of the metal woven layer, for heating the sampling gas in the gas sampling tube, a flame resistant tape wound around an outer circumference of the of the heating pad, a plurality of signal transmission lines circumferentially spaced apart from one another are arranged outside the flame resistant tape, and a sheath located outside the signal transmission line; and a joint assembly arranged on an end of the tube bundle body, for connecting to an analysis device or a sampling device.

16. A sampling analysis system, comprising:

a gas chromatograph, an ion mobility spectrometer and a gas collection sampler;

wherein the gas collection sampler is connected with the ion mobility spectrometer through the sampling tube bundle according to claim 1.

17. The sample analysis system according to claim 16, wherein:

the gas collection sampler is connected with the gas chromatograph through a sampling tube bundle, the sampling tube bundle comprises a tube bundle body comprising a gas sampling tube for transmitting a sampling gas, a metal woven layer wrapping an outer circumference of the gas sampling tube, a heating pad comprising a heat tracing cable wrapping an outer circumference of the metal woven layer, for heating the sampling gas in the gas sampling tube, a flame resistant tape wound around an outer circumference of the of the heating pad, a plurality of signal transmission lines circumferentially spaced apart from one another are arranged outside the flame resistant tape, and a sheath located outside the signal transmission line; and a joint assembly arranged on an end of the tube bundle body, for connecting to an analysis device or a sampling device.

18. The sample analysis system according to claim 16, wherein:

the gas chromatograph is connected with the ion mobility spectrometer through a sampling tube bundle, the sampling tube bundle comprises a tube bundle body comprising a gas sampling tube for transmitting a sampling gas, a metal woven layer wrapping an outer circumference of the gas sampling tube, a heating pad comprising a heat tracing cable wrapping an outer circumference of the metal woven layer, for heating the sampling gas in the gas sampling tube, a flame resistant tape wound around an outer circumference of the of the heating pad, a plurality of signal transmission lines circumferentially spaced apart from one another are arranged outside the flame resistant tape, and a sheath located outside the signal transmission line; and a joint assembly arranged on an end of the tube bundle body, for connecting to an analysis device or a sampling device.

19. A preparation method of a sampling tube bundle, comprising:

providing a gas sampling tube;

weaving and wrapping a metal woven layer around the outer circumference of the gas sampling tube;

sticking a temperature sensor to the metal woven layer;

winding a heat tracing cable around an outer circumference of the metal woven layer;

winding a flame resistant tape around the outer circumference of the heat tracing cable;

winding and fixing a plurality of signal transmission lines around an outer circumference of the flame resistant tape by using a fireproof layer, and an end of the tube bundle being connected with a joint assembly;

coating a heat insulation layer around an outer circumference of the fireproof layer; and weaving and wrapping a woven mesh around the outer circumference of the heat insulation layer.

* * * * *